United States Patent [19]

Gamo et al.

[11] 4,358,432
[45] Nov. 9, 1982

[54] MATERIAL FOR HYDROGEN ABSORPTION AND DESORPTION

[75] Inventors: Takaharu Gamo, Fujiidera; Yoshio Moriwaki, Moriguchi; Toshio Yamashita, Katano, all of Japan

[73] Assignee: Matsushita Electric Industrial Co., Ltd., Japan

[21] Appl. No.: 819,510

[22] Filed: Jul. 26, 1977

[30] Foreign Application Priority Data

Jul. 26, 1976 [JP] Japan .................................. 51-89439
Aug. 5, 1976 [JP] Japan .................................. 51-93643

[51] Int. Cl.$^3$ .............................................. C01B 6/24
[52] U.S. Cl. ................................ 423/644; 148/426; 420/900
[58] Field of Search .................... 75/170, 171; 148/32, 148/32.5; 34/15; 62/48; 423/644

[56] References Cited

U.S. PATENT DOCUMENTS 4,096,641  6/1978  Sandrock ................................ 62/48
4,242,315  12/1980  Bruning et al. ....................... 423/644

Primary Examiner—R. Dean
Attorney, Agent, or Firm—Wenderoth, Lind & Ponack

[57] ABSTRACT

An economical metallic material for absorption and desorption of hydrogen comprising an alloy having the general formula represented by $AB_x$, wherein A is Ca or a metallic material which is an alloy including Ca, B is Ni or a metallic material which is an alloy including Ni, and x is in the range of 3.8–6.3, and exhibiting a hydrogen dissociation equilibrium pressure (or plateau pressure, pressure of the plateau region of hydrogen dissociation pressure-hydride composition isotherm) below 1 atm at normal temperatures.

The material of the invention very easily absorbs large amounts of hydrogen and efficiently releases it at other predetermined temperatures, pressure and electrochemical conditions, whereby it is able to store hydrogen safely, usefully and economically. It is also suitable for use especially as media for thermal energy storage such as solar energy, waste heat from the electric power generators, and iron foundries, as the alloy of this invention has a plateau pressure below 1 atm at room temperature and of several atmospheres at 35°–100° C.

6 Claims, 7 Drawing Figures

MATERIAL FOR HYDROGEN ABSORPTION AND DESORPTION

This invention relates to material for absorbing and releasing hydrogen and especially to a Ca-Ni alloy system for storing hydrogen or heat.

It is generally known that hydrogen is stored in a high pressure vessel under a high pressure or is stored as a cryogenic liquid being cooled to an extremely low temperature. However, both methods described above require a special vessel to store hydrogen. In the former method, the amount of hydrogen which may be stored in unit volume of the vessel is small because of the small hydrogen density, even though hydrogen is compressed to a pressure higher than 100 atm. The latter method requires prudential countermeasures for evaporation of liquid hydrogen by external heat. In both methods, the storage device becomes extremely large, therefore it is inconvenient for carrying and is impractical.

It is known that some kinds of metal or alloy store hydrogen and release it reversibly. This is considered to be an excellent hydrogen storage method because the amount of hydrogen absorption in a unit volume of metal is large. A reaction using this method is a solid-gas reaction with exothermic heat of $-\Delta H_f [Kcal/mol\ H_2]$ via the following reaction:

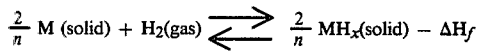

$$\frac{2}{n} M\ (solid) + H_2(gas) \rightleftarrows \frac{2}{n} MH_x(solid) - \Delta H_f$$

Namely the metal or alloy in a solid state absorbs hydrogen with high density under conditions of peculiar temperature and pressure of hydrogen gas or under electrochemical conditions and releases hydrogen reversibly by changing above conditions.

The exothermic heat in this reaction is considerably large. Consequently, the material for absorbing and releasing hydrogen is used for storage of not only hydrogen but also heat energy.

It is known that there are heat storage methods using sensible heat of matter or methods using latent heat of matter. An example of the former method is a solar house using water as medium of heat storage. An example of the latter is a method using the latent heat of fusion of matter such as a eutectic mixture of alkali and alkali earth metal, or paraffin as medium of heat storage. A heat storage device according to above-mentioned methods can not avoid dispersion of heat to some degree even if heat insulation is sufficient, because heat is stored as such.

On the other hand, the methods using metal hydrides can store the heat energy semipermanently without special heat insulation. Thus, the method using a metal hydrides is superior as method of heat storage. Recently, it has been required to obtain heat energy from heat sources of comparatively low temperature such as solar heat and waste heat from power plants and iron works.

In order to store heat energy from such sources of low temperature, hydrogen must be released from metal hydride at low temperature (about 35°-70° C.). However, hitherto known metal hydrides such as $MgH_2$, $TiH_2$ etc., require extreme high temperature in order that dissociation equilibrium pressure (or so called plateau pressure, which is the pressure of the plateau region of hydrogen dissociation pressure-hydride composition isotherm) becomes more than atmospheric pressure. Accordingly it is impossible for these metal hydrides to absorb energy from heat sources of comparatively low temperature.

On the other hand, hitherto known metal hydrides such as TiFe, $LaNi_5$ etc., have plateau pressures of more than atmospheric pressure at room temperature. Consequently, when solar energy is not supplyed to metal hydrides, in which the temperature becomes below 30° C., metal hydrides do not absorb hydrogen, so that stored heat is not dissipated.

It is an object of the present invention to provide a material for hydrogen absorption and desorption which absorbs hydrogen and releases it reversibly under easily obtainable conditions, so as to be able to store hydrogen safely or utilize heat obtained from a heat source of not so high temperature.

According to the present invention, the such material comprises an alloy represented by the formula $AB_x$ in which A represents metal comprising calcium, B represents metal comprising nickel, and x is in the range of 3.8–6.3, and hydride of said alloy has a hydrogen dissociation equilibrium pressure less than the atmospheric pressure at normal temperatures.

The invention is described in further detail in conjunction with accompanying drawings, in which.

Figure 1:
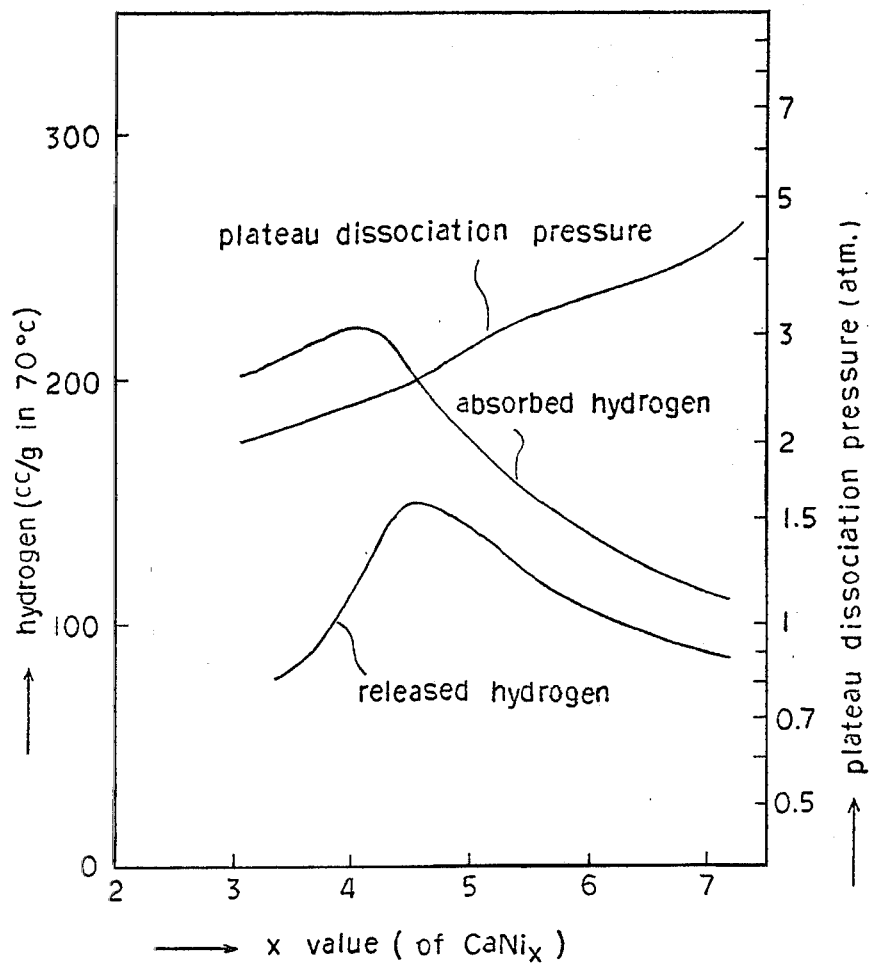
FIG. 1 is a graph showing the relation of the amount of absorbed and released hydrogen, and the relationship of a plateau pressure at 70° C. to the value of x in an alloy having the general formula $CaNi_x$ of the embodiment according to the present invention.

Table 1 shows some characteristics value of hitherto known media for storing heat and $CaNi_{4.55}H_{5.90}$ which is hydride of a material of this invention.

TABLE 1

| Medium | Type | heat storage temperature [°C.] | heat storage amount [cal/g] | sensible heat amount [cal/g] |
|---|---|---|---|---|
| $H_2O$ | sensible heat | 100 | 70 | 70 |
| $CaCl_2 6H_2O$ | latent heat | 29–39 | 42 | — |
| $NaCl$—$NaNO_3$ | | 297 | 48 | 80 |
| $CaCl_2$—$LiNO_3$ | | 268 | 43 | 60 |
| $MgH_2$ | hydride | 400 | 730 | 90 |
| $TiH_2$ | | ~600 | 580 | 120 |
| $CaNi_{4.55}H_{5.90}$ | | ~60 | 80 | 10 |

In this Table, the heat storage data includes no sensible heat values except for $H_2O$. The sensible heat amount is based on difference between heat storage temperature and room temperature (30° C.), and heat capacity.

It is evident from Table 1 that the method using metal hydrides exhibit greater heat storage than the method using sensible or latent heat. And, the quantity of sensible heat of metal hydrides which quantity corresponds to heat capacity of the heat storage medium from room temperature to the heat storage temperature, is comparatively smaller than the quantity of its heat storage, so that metal hydride is superior as a heat storage medium.

In comparison with the method using sensible or latent heat, the Ca—Ni alloy hydride of this embodiment exhibits more than 2 times the heat storage and 1/6 to ⅛ times the sensible heat.

And although compared to hitherto known hydrides the alloy hydride of this invention is inferior to hitherto known hydride in heat storage amount, it is superior in heat storage temperature. Namely the heat storage temperature of hitherto known hydrides is extremely high e.g., 400° to 600° C. On the other hand, the heat storage temperature of alloy hydride of this embodiment is 60° C. Accordingly, hitherto known hydride can be applied only to when using a heat source of extremely high temperature. On the other hand, alloy hydride of this invention can be applied when using a heat source of comparatively low temperature such as solar energy. Thus, alloy hydride of this invention is superior and practical.

In the foregoing, it is described that the material of the present invention has an excellent characteristics for heat energy storage.

In the following, it will be described that the material of the present invention has a further excellent hydrogen storage characteristic.

As described above, Mg, Mg-Ni system alloy, R-Ni and R-Co system alloy (where R is a rare-earth element), and Ti-Fe system alloy have hitherto been used as a material for absorbing and releasing hydrogen. However, as for Mg and Mg-Ni system alloys, although they can absorb a relatively large amount of hydrogen per unit weight, they absorb and release hydrogen only at a high temperature of more than 250° C. The R-Ni and R-Co system alloys can absorb and release hydrogen at room temperature, but they are very expensive and have a poor hydrogen absorption capacity per unit weight. The Ti-Fe system alloy can also release hydrogen at room temperature, but it has to be subjected to a high temperature and hydrogen pressure for first activation. Furthermore, it has such difficulties that an absorption and desorption rate is relatively low and the hysterisis in absorption-desorption cycles is large.

On the other hand, a Ca-Ni system alloy of the present invention has much larger hydrogen absorption capacity per unit weight than those of the R-Ni and R-Co system alloys and the Ti-Fe system alloy, and has a high absorption and desorption rate. Moreover, the alloy of the present invention is superior to the above-described prior art materials in that it can release or absorb hydrogen under easily obtainable conditions. In addition, the alloy of the present invention is relatively low in price and does not release hydrogen at room temperature, because of its lower plateau pressure i.e. lower than 1 atm., resulting in a safe storage of hydrogen.

Netherland Pat. Nos. 6,901,276 and 6,906,305 disclose that $CaNi_5$ which is one composition of the Ca-Ni system alloy of the present invention has a hydrogen absorption characteristic. However, with the of $CaNi_5$ described in these patents, the plateau pressure is very high, in the order of 15 atm., and hydrogen absorption capacity is very small in the order of 100 cc/g, so that it can not be put into practical use. It is necessary that the alloy which may be used for hydrogen or heat energy storage includes a hexagonal structure phase of $CaNi_5$ in all regions of the alloy phase. Generally, with Ca-Ni system alloy, because Ca has a high vapor pressure and lower melting point being, i.e. lower than that of Ni by about 600° C., it is difficult to obtain the desired alloy having a homogeneous phase, by the application of conventional methods of manufacturing rare earth alloys or the like. Thus, it seems that the poor characteristics of $CaNi_5$ described in the above patents results from its heterogeneous phase.

In this invention, as will be seen from several examples below, a unique method of production of the metallic material is employed to avoid compositional inaccuracy caused by evaporation of Ca and heterogeneity of alloy phase caused by a larger difference of melting point.

(1) Beforehand, there is measured the evaporated amount of Ca in the process of melting and Ca in excess of this amount, is employed in the starting material. Then the alloy is accurately prepared by melting the starting material according to intended atomic ratio.

(2) The alloys produced are broken up, remelted, Ni is added, and the alloy is remelted with an inductive or arc melting furnace again. Repeating this process several times, there is obtained the desired binary alloy with a homogeneous phase.

(3) The homogeneity and crystallization of the alloys thus prepared can be further improved by means of annealing at high temperature for a long time.

We observed by means of X-ray analysis that all Ca-Ni alloys of this invention prepared by such process have the desired single phase with a $CaCu_5$ structure in the region more than 95% of the alloy.

Besides, we demonstrated that alloy phase obtained by above mentioned process which is richer in Ca than the former known Ca-Ni phase compositions exhibits excellent absorption and desorption properties, and we observed that an alloy of the plateau pressure higher than that of Ca-Ni finally system alloy is obtained, keeping a large hydrogen content as well as the original Ca-Ni alloys, by partly replacing the Ca or Ni in Ca-Ni alloy by other metals such as Mg.

A suitable method of manufacture of such Ca-Ni alloys of this invention is as follows. There is prepared a grain of 99% pure calcium such as commercially available, and a commercially available 99.9% pure wire nickel. Ca-Ni alloys are formed if these materials, in an alumina crucible, are melted together under argon gas in high frequency induction heating furnace by the said process. Thus prepared compounds are annealed under argon or in vacuum at a temperature of about 1000° C. for a period of approximately 10 hours. Desired homogeneous Ca-Ni alloys which are more than 95% single phase, prepared in the said way, are divided into several parts, to effect hydrogenation, and are introduced into a pressure-resistant reaction vessel, from which gas is then evacuated. Then 99.99% pure hydrogen gas is introduced into the reaction vessel, the reaction vessel is sealed, and the pressure of hydrogen gas therein is brought to and held at approximately 10 atmospheres. Thereby absorption of hydrogen by the Ca-Ni alloy proceeds rapidly at room temperature, and in a short time there is formed a hydride of the alloy in which hydrogen is stored.

If the pressure of hydrogen gas around the hydride thus formed is reduced or if the ambient temperature is increased to about 35°–100° C., hydrogen is reversibly released from the hydride and is again available as gaseous hydrogen.

With respect to examples of Ca-Ni alloys produced on the basis of these considerations, hydrogenation temperature, the number of hydrogen atom absorbed per molecule alloy at this temperature, the amount of hydrogen absorbed at 20° C. (cc/gr), and plateau pressure, are shown in Table 2, the plateau pressure being indicated as the hydrogen pressure at the plateau region of hydrogen dissociation pressure-hydride composition isotherm.

TABLE 2

| Alloy composition | Hydrogenation temp. | Hydrogen absorption at.H mol. Alloy | $H_2$ (cc, at 20° C.) Alloy wt. (g) | Plateau pressure (atm.) |
|---|---|---|---|---|
| Known CaNi$_5$ | 21 | 2.98 | 107 | 15 |
| CaNi$_{3.85}$ | 20 | 5.53 | 250 | 0.3 |
|  | 70 | 4.83 | 218 | 2.3 |
|  | 100 | 4.60 | 208 | 5.5 |
| CaNi$_{4.17}$ | 20 | 5.76 | 243 | 0.35 |
|  | 70 | 5.21 | 220 | 2.4 |
|  | 100 | 4.93 | 208 | 6 |
| CaNi$_{4.55}$ | 20 | 5.90 | 231 | 0.4 |
|  | 70 | 5.03 | 197 | 2.5 |
|  | 100 | 4.80 | 188 | 6.5 |
| CaNi$_{4.99}$ | 20 | 5.57 | 201 | 0.5 |
|  | 70 | 4.71 | 170 | 3 |
| CaNi$_{5.56}$ | 20 | 5.64 | 185 | 0.6 |
|  | 70 | 4.88 | 160 | 3.3 |
| CaNi$_{6.25}$ | 20 | 5.38 | 159 | 0.7 |
|  | 70 | 4.71 | 139 | 3.5 |
| Ca$_{0.91}$Mg$_{0.09}$Ni$_{4.55}$ | 25 | 5.42 | 213 | 0.8 |
|  | 55 | 4.81 | 189 | 2.2 |
|  | 100 | 4.35 | 171 | 9.0 |
| Ca$_{0.82}$Mg$_{0.18}$Ni$_{4.55}$ | 25 | 4.28 | 169 | 1.5 |
|  | 54 | 3.92 | 155 | 3.2 |
| Ca$_{0.7}$Mg$_{0.3}$Ni$_{4.55}$ | 25 | 3.20 | 127 | 2.6 |
| Ca$_{0.91}$Mg$_{0.09}$Ni$_{3.8}$ | 25 | 5.18 | 238 | 0.62 |
| Ca$_{0.91}$Mg$_{0.09}$Ni$_5$ | 25 | 5.31 | 192 | 0.93 |
| Ca$_{0.91}$Mg$_{0.09}$Ni$_{5.2}$ | 25 | 4.44 | 155 | 1.2 |
| Ca$_{4.4}$Mn$_{0.2}$ | 23 | 5.43 | 211 | 0.7 |
|  | 100 | 4.48 | 174 | 8 |
| Ca$_{4.1}$Mn$_{0.5}$ | 22 | 4.74 | 185 | — |
|  | 100 | 3.36 | 131 | — |
| CaNi$_{4.4}$Fe$_{0.2}$ | 23 | 4.87 | 189 | 0.4 |
|  | 100 | 4.48 | 174 | 6 |
| CaNi$_{4.1}$Fe$_{0.5}$ | 23 | 3.85 | 150 | — |
|  | 100 | 3.24 | 126 | — |
| CaNi$_{4.4}$Cr$_{0.2}$ | 27 | 5.24 | 204 | 0.46 |
|  | 100 | 4.52 | 176 | 5.5 |
| CaNi$_{4.7}$Cu$_{0.3}$ | 18 | 5.10 | 183 | 0.33 |
|  | 67 | 4.77 | 171 | 1.8 |
|  | 100 | 4.49 | 161 | 5.5 |
| CaNi$_{4.0}$Cu$_{1.0}$ | 18 | 4.51 | 160 | — |
|  | 66 | 4.17 | 148 | 0.7 |
|  | 100 | 3.91 | 139 | 1.6 |
| CaNi$_{3.0}$Cu$_{2.0}$ | 18 | 3.71 | 130 | — |
|  | 63 | 2.83 | 99 | — |
| CaNi$_{2.0}$Cu$_{3.0}$ | 18 | 2.72 | 94 | — |
| CaNi$_{1.0}$Cu$_{4.0}$ | 18 | 0.82 | 28 | — |

As indicated in Table 2, metallic materials for hydrogen storage according to the present invention which principally includes calcium and nickel, have large hydrogen storing capacity (more than 200 cc/g at normal temperatures), absorb hydrogen based on weight of alloy twice larger than the known one, and have the plateau pressure of several atmosphere at 35°–70° C., so as to be suitable for hydrogen storage or heat storage media.

The invention is described in further detail below with reference to the range of alloy composition and operation temperature with the excellent properties.

FIG. 1 is a graph which plots the relationship between the amount of hydrogen absorption (cc/g) at 70° C., the amount of released hydrogen (cc/g) in one atm at 70° C., and the plateau dissociation pressure at 70° C. to the x of CaNi$_x$ alloy composition. As seen in FIG. 1, if the x value in CaNi$_x$ is smaller than 3.8, the amount of hydrogen absorption is very large, but the amount of released hydrogen is less than 100 cc/g, which is insufficient for practical use, owing to the low plateau pressure. On the other hand, if the x value is more than 6.3, the amount of released hydrogen is also less than 100 cc/g, as the decrease of hydrogen desorption occurs based on the decrease of hydrogen absorption. Besides, the range of x value, in view of heat storage media with the available plateau pressure of 2–4 atm is about 3.8–6.3. Consequently, the x value of CaNi$_x$ must be in the range of 3.8–6.3. The alloy composition in CaNi alloy which has the best properties, i.e. x values of 4.50–4.60, as seen from FIG. 1. They absorb hydrogen in a quantity of about 195–202 cc/g, desorb hydrogen in a quantity of about 150 cc/g, and have the plateau pressure of about 2.5 atm at 70° C. Therefore the such Ca-Ni alloys with x-value of 4.50–4.60, are highly effective as hydrogen storage and thermal energy storage media.

Figure 2:
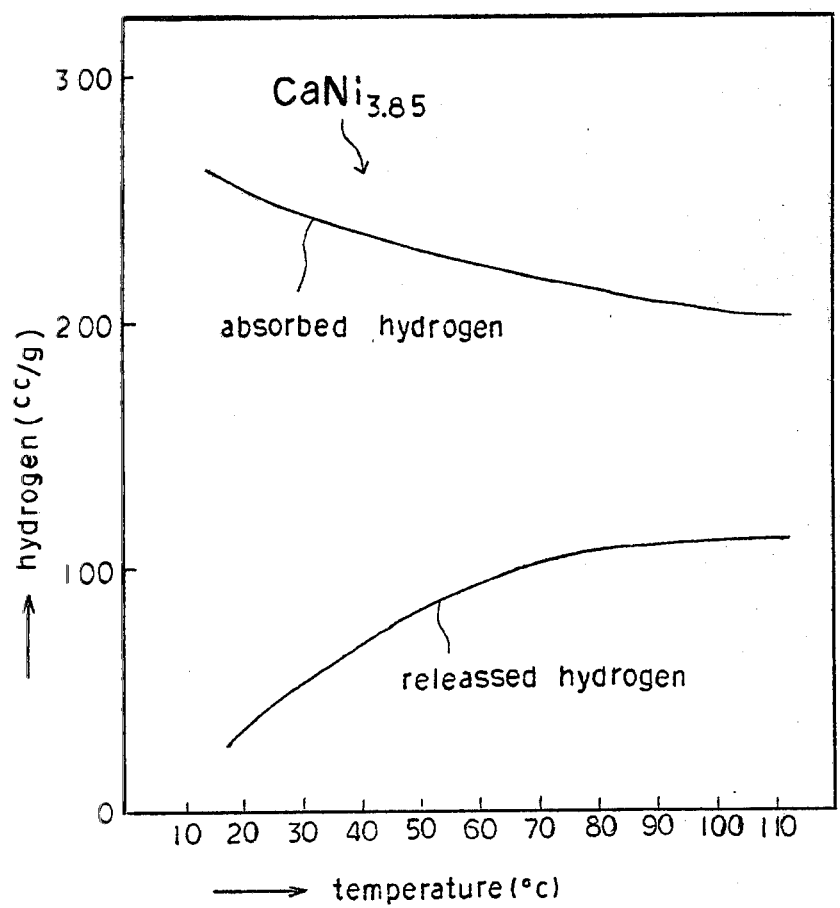
FIGS. 2 and 3 are graphs showing the relationship of the amount of absorbed and released hydrogen to a working temperature in an alloy being expressed as $CaNi_{3.85}$ and $CaNi_{4.55}$, respectively.
Figure 3:
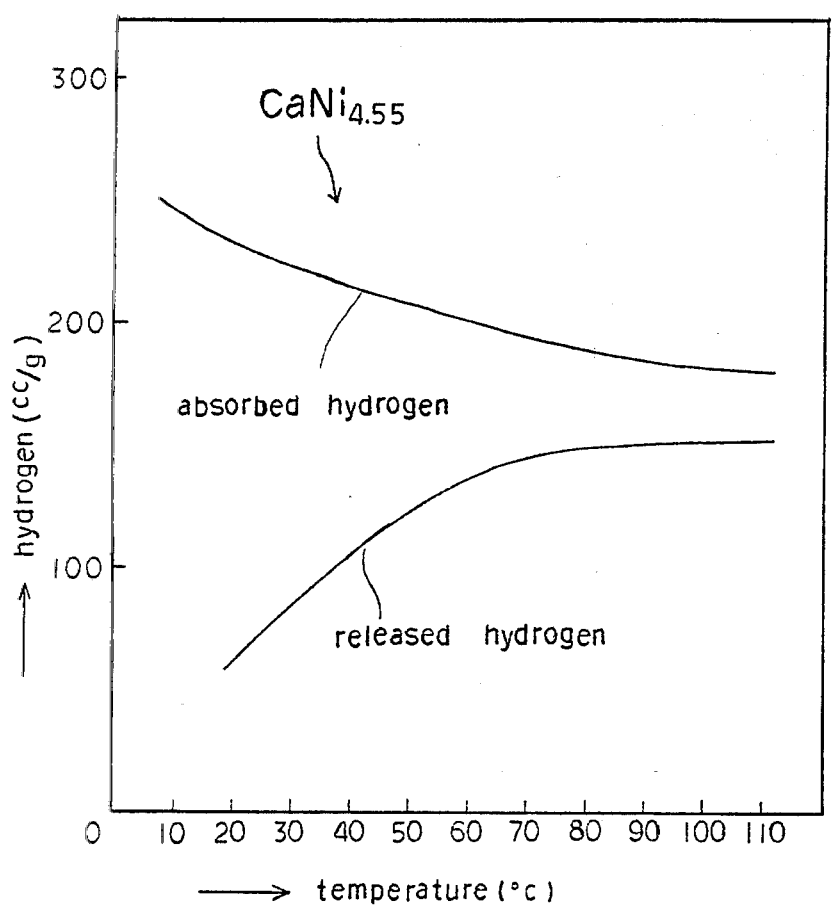

FIG. 2 and FIG. 3 show the relationship between the amount of the hydrogen absorption and desorption at 1 atm against the working temperature (the temperature of the material which absorb, desorb or keep hydrogen), for the alloys of CaNi$_{3.85}$ and CaNi$_{4.55}$, respectively. As indicated in FIG. 2 and FIG. 3, although the amount of hydrogen absorption is large, because the plateau dissociation pressure is low e.g. below 35° C., the amount of hydrogen desorption is very small. Therefore, the amount of heat storage utilizing the endothermic reaction caused by hydrogen dissociation from the hydride is also small. On the other hand, at more than 100° C., the quantity of absorption decreases in contrast to slight increase in hydrogen desorption. Therefore, a suitable working temperature in the range of 35°–100° C. That is, we notice, it is desirable that they store thermal energy at about 35°–100° C., and radiate it below the above range, in order to be suitable for the thermal energy storage media.

As shown by above examples, CaNi$_x$(3.8<x<6.3) are highly effective as hydrogen or heat storage media, when are operated at 35°–100° C.

Figure 4:
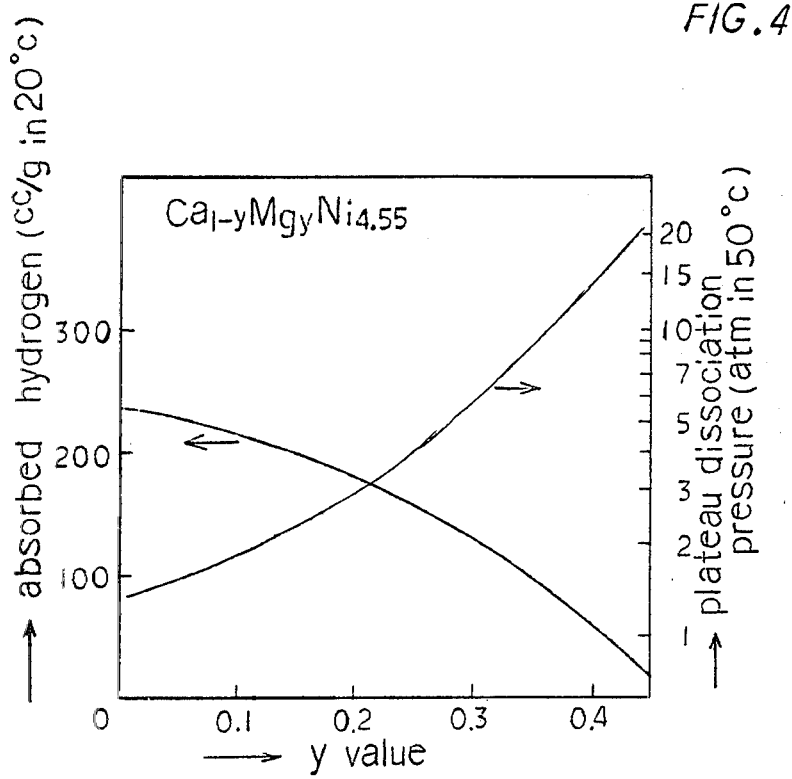
FIG. 4 is a graph showing the relation of the amount of absorbed hydrogen at normal temperature, and the relationship of a plateau pressure at 50° C. to the value of y in an alloy having the general formula $Ca_{1-y}Mg_yNi_{4.55}$.

The compound Ca$_{1-y}$Mg$_y$Ni$_x$ wherein Ca is partially replaced by Mg, exhibits a rise in plateau dissociation pressure with incease of Mg quantity (y) at the same temperature, as seen from Table 2. However, on the other hand, the quantity of hydrogen absorption decreases with increase of y (Mg content), and also, the initial hydrogenation becomes relatively difficult, resulting in a decrease of the amount of heat storage. The relationship between absorption hydrogen (cc/g) at normal temperature or the plateau dissociation pressure (atm) at 50° C. and y of the formula Ca$_{1-y}$Mg$_y$Ni$_{4.55}$ are shown in FIG. 4. As illustrated in FIG. 4, if y (Mg amount) increases to larger than 0.27, the amount of hydrogen absorption decreases to smaller than 150 cc/g, in which composition the alloy cannot be used practically, and the homgeneity of the alloys prepared is reduced. On the other side, if the plateau pressure is smaller than 1.5 atm, heating at high temperature (i.e., high temperature heat source) is necessary for the release of hydrogen. Therefore, the material becomes unsuitable for the storage media for thermal energy such as solar energy and the waste heat from plants, because of the difficult release conditions. However, as shown in FIG. 4, if y is larger than 0, there is no such trouble because the plateau pressure is larger than 1.5 atm. In the Ca-Ni alloys of the general formula $Ca_{1-y}Mg_yNi_x$, optimum hydride properties are given in the ranges of y of 0–0.27 wherein $y \neq 0$.

And with respect to the x value in $Ca_{1-y}Mg_yNi_x$ also, the plateau dissociation pressure increases with an increase of Ni amount (x value) similarly to the Ca-Ni binary alloy system. Therefore, although the hydrogen can be released without heating at high temperature, the amount of hydrogen absorption decreases.

Figure 5:
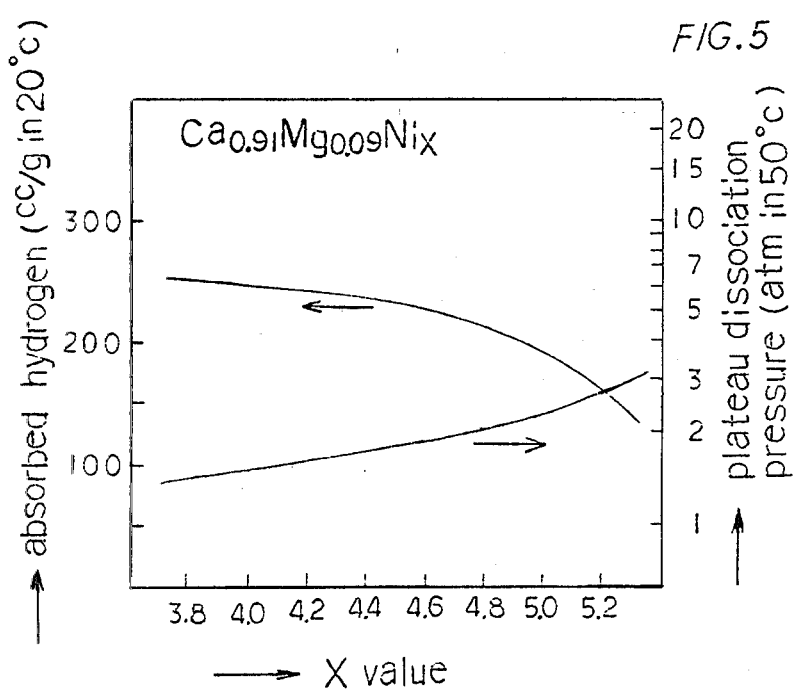
FIG. 5 is a graph showing the relation of the amount of absorbed hydrogen at normal temperature, and the relationship of a plateau pressure at 50° C. to the value of x in an alloy having the general formula $Ca_{0.91}Mg_{0.09}Ni_x$.

Especially with respect to $Ca_{0.91}Mg_{0.09}Ni_x$, the relationship of the amount of hydrogen absorption and the plateau pressure to x value are shown in FIG. 5, as an example. From FIG. 5 it is seen that the x value of $Ca_{1-y}Mg_yNi_x$ alloy must be smaller than 5.2, since the hydrogen absorption of more than 150 cc/g is necessary in view of practical application. On the other hand, the x value must be larger than 3.8 in order that the plateau pressure be not smaller than 1.5 atm. When the plateau pressure is smaller than 1.5 atm, the heating temperature (the heat source temperature) in hydrogen release have to be higher, and moreover, the effect of the plateau increase by partly replacing the Ca by Mg disappears. Therefore, the range of x value has to be from 3.8 to 5.2. The plateau pressure of Ca-Ni binary system alloys is lower but amount of hydrogen absorption of the same is larger than Ca-Mg-Ni ternary system alloy at the same temperature. The composition of Ca-Ni system alloy to be chosen is determined according to the purpose of use, such as hydrogen storage (i.e., according to the operation conditions or methods), heat storage (i.e., according to the temperature of heat source, type, and system), and the electrode of the storage battery or fuel cell (i.e., according to kind of electrolyte, operation condition).

Figure 6:
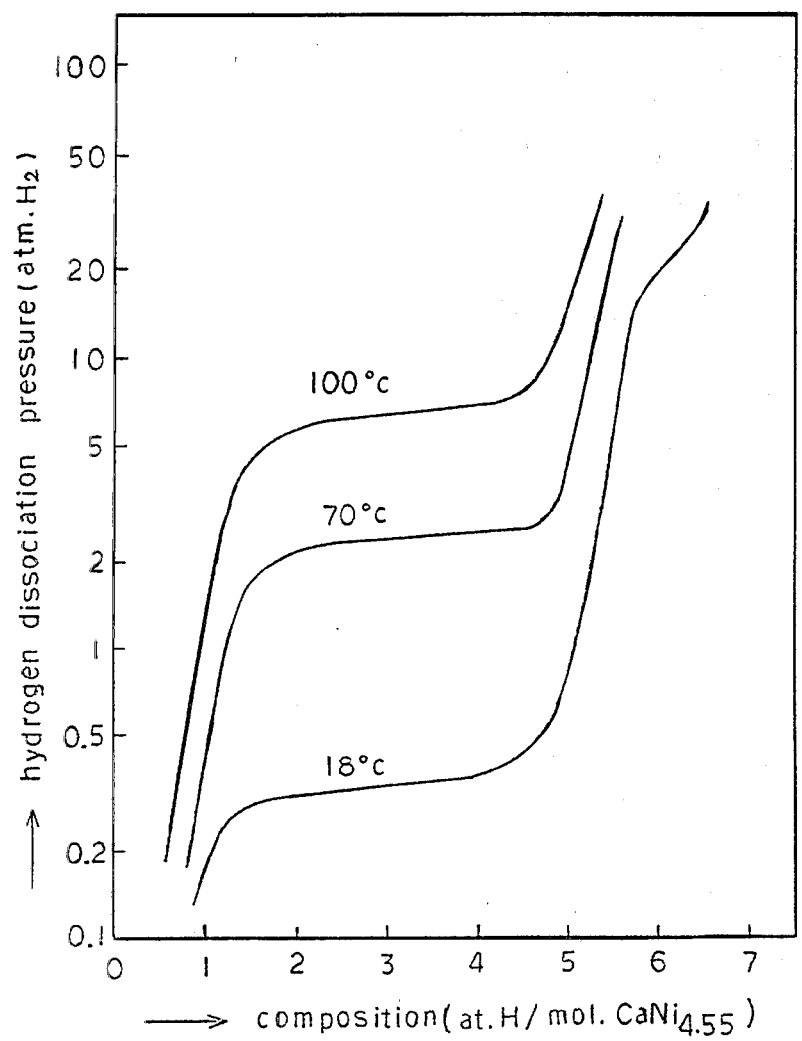
FIG. 6 is a graph which plots equilibrium pressure composition isotherms for the system $CaNi_{4.55}$—H by way of example of the hydrogenation characteristics of Ca—Ni alloy according to the invention.
Figure 7:
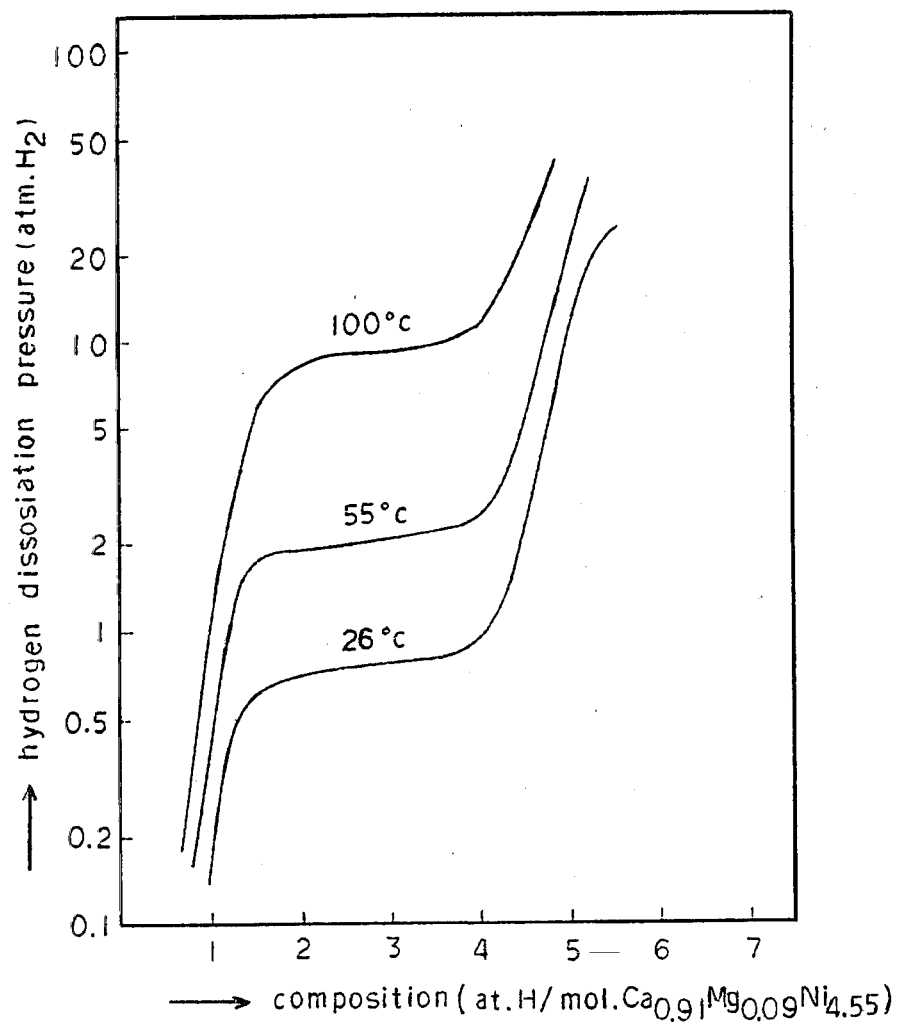
FIG. 7 is a similar drawing which plots equilibrium pressure-composition isotherms for the system $Ca_{0.91}Mg_{0.09}$ $Ca_{0.91}Mg_{0.09}Ni_{4.55}$—H.

One can draw the isotherms in the graph, which has the logarithm of the hydrogen dissociation pressure for a vertical axis and the hydride composition (the number of hydrogen atom/the number of alloy molecule) for a horizontal axis, with regard to the each of the materials of this invention. As an example of the invention, hydrogen dissociation equilibrium-hydrogen composition isotherms for the system of $CaNi_{4.55}$—H are shown in FIG. 6, and similar curves for the system $Ca_{0.91}Mg_{0.09}Ni_{4.55}$—H are shown in FIG. 7. As shown in FIG. 6, the plateau pressure of $CaNi_{4.55}$ hydride at 70° C. is approximately 2–3 atm, which pressure is suitable for practical use. And as shown in FIG. 7, the requisite temperature at the same plateau pressure for $Ca_{0.91}Mg_{0.09}Ni_{4.55}$ hydride is lower than the case of FIG. 6, although the amount of hydrogen absorption is smaller than the former. That is, $Ca_{0.91}Mg_{0.09}Ni_{4.55}$ hydride does not need to be heated to high temperature.

The each of these hydrogen dissociation isotherms have the nearly horizontal plateau region at the peculiar temperature region of a each alloy. In such a plateau region, the above material can absorb relatively a large quantity of hydrogen by means of a little change of hydrogen pressure and can release it in a similar inverse process. Therefore, the larger the plateau region is, the more available the metal hydride is for the use. And if the temperature in the condition that the plateau pressure is 1 atm is lower, it is not necessary to heat the hydride at high temperature when the hydrogen is released or thermal energy is stored. Although the especially excellent composition in Ca-Mg-Ni alloy system, which is $Ca_{0.91}Mg_{0.09}Ni_{4.55}$, has a smaller amount of hydrogen absorption than $CaNi_{4.55}$, it is advantageous in the viewpoint that the temperature at which the plateau dissociation pressure is 1 atm is low, e.g. about 20° C.

Accordingly, the Ca-Ni alloy system is excellent as a metallic material suitable for hydrogen storage, and moreover, since the temperature at which the hydrogen dissociation pressure is 1 atm is in the range 30°–60° C., the materials of this invention are also applicable as media for storage of thermal energy, such as the solar energy, of low cost, clean and unlimited.

Further, since hydride heat $-\Delta H_f$ of formation of Ca-Ni alloy system according to the invention, is about 8 Kcal per mol $H_2$, if the invention material reacts with one molecule hydrogen gas, the quantity of heat of about 8 Kcal/mol $H_2$ is generated. And, based on the property of dissociation pressure-composition isotherm, i.e., plateau pressure is the value from 0.1 to 1.0 atm at normal temperatures, and the chemical nature, i.e., in terms of reaction with electrolytes, indicates that the Ca-Ni alloy system of the invention is also suitable for the application to a fuel cell or electrode of storage battery.

Moreover, the alloy of this invention hardly forms the layer of nitride or oxide, is almost never influenced by impurities in the hydrogen gas, easily absorbs hydrogen in a short time, and reversibly releases high purity hydrogen. Accordingly the material of the invention can also be used for purifying the hydrogen.

What is claimed is:

1. Material for hydrogen absorption and desorption comprising an alloy represented by the formula $AB_x$ in which A represents an alloy consisting of calcium and magnesium, B represents a metal comprising nickel, x is a value indicating the ratio of B to A and is 3.8 to 6.3, the hydride of said alloy having a hydrogen dissociation eqilibrium pressure of less than atmospheric pressure at room temperature and of several atmospheres at 35° to 100° C., said material having a single homogeneous hexagonal structure phase of the $CaCu_5$ type in more than 95% of the alloy.

2. The material of claim 1 which has the formula $Ca_{1-y}Mg_yNi_x$, in which $0 < y \leq 0.27$.

3. The material of claim 2 wherein y is approximately equal to 0.1.

4. A method for heat storage which comprises contacting the hydride of the alloy of any one of claims 1 to 3 with a heat source.

5. The method for heat storage according to claim 4 wherein the heat source is at a temperature of between about 35° and 100° C.

6. The method for heat storage according to claim 5 wherein the heat source is at a temperature of between about 35° and 70° C.

* * * * *